United States Patent [19]

Tsang et al.

[11] Patent Number: 4,617,165
[45] Date of Patent: Oct. 14, 1986

[54] MOLDED BRAKE PAD

[76] Inventors: Peter H. S. Tsang, 6624 Corral Ct., Union Lake, Mich. 48085; Joseph P. Coyle, 14415 12 Mile Rd., Warren, Mich. 48037; Seong K. Rhee, 21222 Summerside La., Northville, Mich. 48167

[21] Appl. No.: 733,332

[22] Filed: May 13, 1985

[51] Int. Cl.⁴ .................. B29C 71/00; C03C 17/00
[52] U.S. Cl. .................. 264/236; 264/331.22; 264/347; 523/152; 523/153; 523/155; 523/156; 523/157; 523/158; 523/159
[58] Field of Search .......... 523/152, 153, 155, 156, 523/157, 158, 159; 264/236, 331.22, 347

[56] References Cited
U.S. PATENT DOCUMENTS 4,363,884 12/1982 Ogiwara .................... 523/155

*Primary Examiner*—Lewis T. Jacobs

[57] ABSTRACT

A composition of material for use as a friction material in a brake and its method of manufacture. Liquid double salts of dibasic and monobasic (ammonium-potassium hydrogen) phosphoric acid (DSP) is added to a dry mixture of reinforcing fiber, friction modifiers, fillers and phenolic resin to create a high viscosity slurry. Thereafter, a metallic (magnesium) oxide and para formaldehyde (para) are added to the slurry. Molds which have been previously heated are filled with the slurry and any excess removed. The metallic oxide reacts with the DSP and the para reacts with the phenolic resin to create a two binder matrix for holding the reinforcing fiber, friction material and fillers in a fixed relationship corresponding to the shape of a brake pad. The brake pads are removed from the molds and transported to a ventilated chamber where the internal curing proceeds at or near ambient temperature to complete the manufacture of the brake pad.

16 Claims, 10 Drawing Figures

| COMPOSITION WEIGHT % | | | | | | | | | | |
|---|---|---|---|---|---|---|---|---|---|---|
| MATERIAL | | A | B | C | D | E | F | G | H | I |
| REINFORCING FIBER | | | 22 | 10 | 21 | 13 | 14 | 60 | 13 | 13 |
| FRICTION MODIFIERS | | 36 | 25 | 71 | 3 | 12 | 13 | 7 | 12 | 12 |
| FILLER | | 31 | 2 | 12 | 54 | 25 | 27 | 16 | 26 | 26 |
| BINDER | EPON 825+ | 33 | | | | | | | | |
| | PHENOLIC RESIN LIQUID | | 24 | 7 | 11 | 12 | 41 | 17 | 22 | 22 |
| AMONIA PHOSPHATE ACID | | | 19 | | 11 | 26 | | | 18 | 18 |
| MAGNESIUM OXIDE | | | 8 | | 3 | 12 | 5 | | 9 | 9 |

MOLDED BRAKE PAD

This invention relates to a molded brake pad wherein liquid double salts of dibasic and monobasic phosphoric acid (DSP) is added to a mixture of reinforcing fiber, friction modifiers, fillers and phenolic resin. Thereafter, metallic oxide and para formaldehyde (para) are added to the mixture and simultaneously react with the DSP and phenolic resin, respectively. The reaction of the metallic oxide with DSP creates an exothermic temperature change in the mixture which acts as a catalyst to accelerate the reaction of the para and phenolic resin. When the phenolic resin and para reaction is completed an infusible two binder matrix is produced.

In the manufacture of brake pads it is normal practice to mix dry ingredients together until a desired blend is achieved. The mixture is thereafter placed in a mold and compressed to a desired density while at the same time being heated in a chamber to initiate a reaction between a curing agent and a binder. The press equipment and curing chamber are expensive both as an initial investment and as a operating process. Unfortunately, if a desired density through pressing is not acheived though such manufacturing process a fast wearing material may be produced.

It is known that various components such as grinding wheels, see U.S. Pat. No. 3,664,819, could be molded. Unfortunately, in such grinding wheels there are often voids between the various particles of abrasive grit, and as such would be unacceptable as a friction pad for a brake.

Room temperature curable epoxy resin, such as disclosed in U.S. Pat. No. 3,704,229 for paints is known to provide a hard protective coating for a substrate. However, when such epoxy resins are used in components that possess bulk or thickness such as a brake pad, the results have not always been satisfactory since the cure rate throughout the entire component has not been uniform.

We have developed a method of manufacturing a friction material which is cured in a ventilated room at ambient temperature and has high density without the need for compressing the friction material in a mold. In this method, reinforcing fiber, friction modifiers, fillers, phenolic resin and DSP are placed in a container to produce a high viscosity mixture. A mixture of metallic oxide (MgO, SiO, CaO, $Al_2O_3$, FeO, $Fe_2O_3$, $Fe_3O_4$, and etc.) and para-formaldehyde (para) powders are simultaneously added to the mixture and blended therewith until a uniform mixture is achieved. This uniform mixture is conveyed into molds. The molds, while normally at room temperature, may be heated for processing some compositions. The molds have a desired shape, however the viscosity of the mixture is selected to allow sufficient flow in the mixture to completely fill the mold. Any excess material is removed from the mold and after an initial green strength is achieved, the resulting friction pads are removed from the molds and allowed to finish curing. The curing takes place in a ventilated room which has a constant temperature of about 20° C. and after 12–24 hours of curing, the friction pad is ready for use as a brake pad.

In this method of manufacture, in order to assure that a sufficient viscosity is present after the metallic oxide powder is added to the mixture, it is necessary to immediately begin the molding since an exothermic reaction is initiated between metallic oxide and DSP in the mixture. The exothermic reaction generates an internal temperature that approches 65° C. for a short time. This initial temperature rise, while a by-product of the reaction, acts as a catalyst for the reaction between the para and phenolic resin. The internal temperature returns to essentially ambient 20° C. as the reactions are concluded.

An advantage of this method of manufacturing a friction material occurs since the viscosity of the friction material can be modified to assure that sufficient flow into any desired shape of mold can achieved and yet a specific desired density is produced in a resulting brake pad with the use of a press.

An additional advantage of this method of manufacturing a friction material occurs through the low temperature curing of the friction material.

It is an object of this invention to provide a method of manufacturing a molded friction material without the need for hot pressing to establish a desired density or additional heat (average room temperature 20° C. is sufficient) to cure a phenolic resin binder.

These advantages and objects should be apparent from reading this specification while viewing the drawings wherein.

Figure 4:
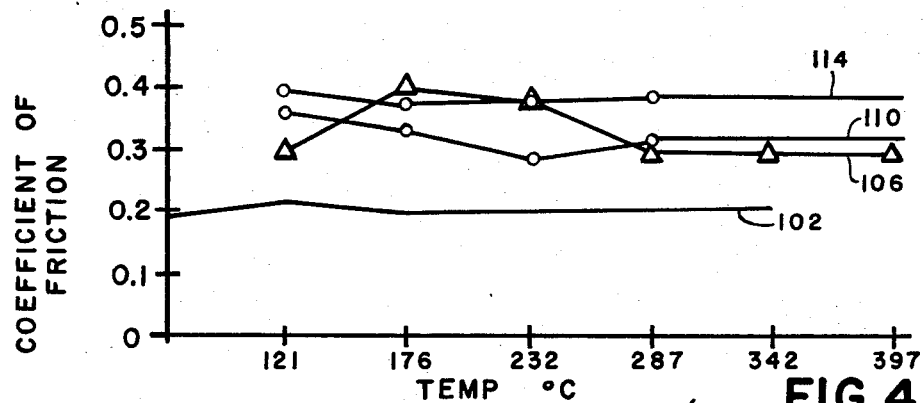
FIG. 4 is a graph illustrating the coefficient of friction for various molded friction pads with respect to changes in operating temperature.
Figure 5:
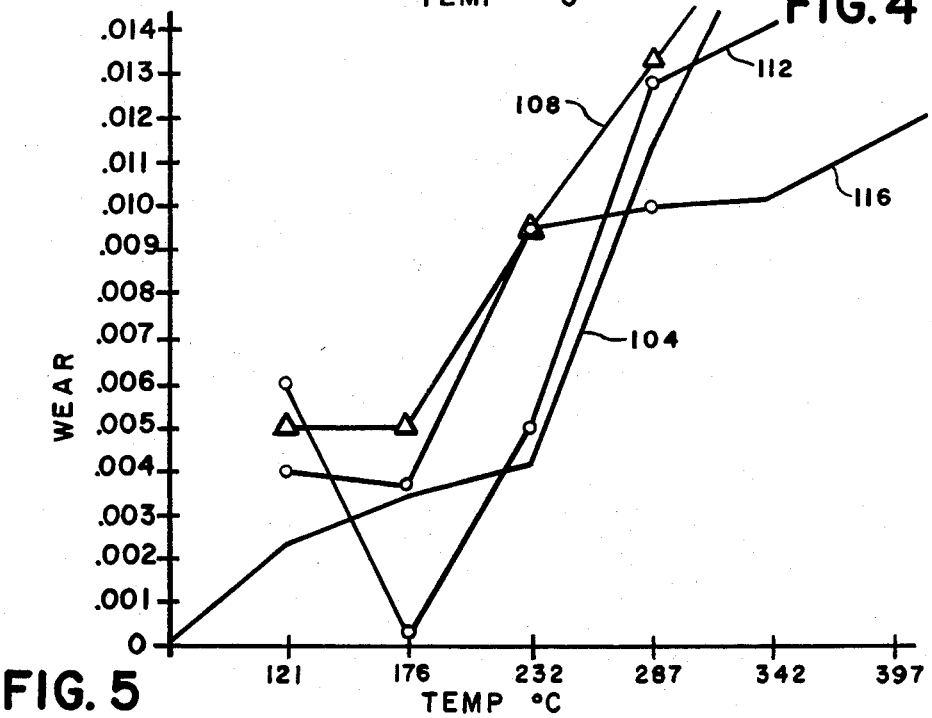
FIG. 5 is a graph illustrating wear with respect to changes in operating temperature associated for the various molded friction pads illustrated in FIG. 4.

In the manufacture of friction pads of the type disclosed in U.S. Pat. No. 4,537,823, filed Nov. 18, 1983, a slurry, made up of friction modifiers (carbon and iron powder), fillers (rubber scrap, barytes and whiting) and a liquid binder (epoxy resin - Epon 825+Curatine Z, an anhydride curing agent, manufactured by Shell Oil Co.), in the proportions for material A shown in FIG. 2 was placed in a mold. The slurry viscosity was high enough that all the particles were uniformily suspended and yet low enough that the mixture could be poured into and completely fill the mold. The mold was transferred to a curing oven having a uniform temperature of about 250° C. After the binder was cured, the resulting friction material was removed from the oven and a sample of composition A tested on a Chase dynamometer. In this test after an initial break-in period, 40 brake applications at 120° C., 175° C., 230° C., 290° C. and 340° C. were made and the resultant coefficient of friction measured to bring the Chase dynamometer to a stop. The average coefficient of friction for the sample of composition A is illustrated by curve 102 in FIG. 4 and the corresponding wear illustrated by curve 104 in FIG. 5. While the coefficient of friction for the sample is low, the composition could be acceptable for some applications. Unfortunately, the sample failed in shear at about 340° C. and the test was stopped. It was evident that composition A lacked the structural strength needed for a brake lining. It was our opinion that before such a composition A could be used in a brake lining that the liquid binder would need to be reduced to a maximum of about 25% by weight and a reinforcing fiber added to provide the structural strength needed to withstand dynamic loading associated with a brake application.

In the manufacture of friction materials it is known that steel fiber, fiber glass, mineral fiber, organic fiber or calcium-sodium metaphosphate fiber uniformly distributed throughout a friction pad would provide the structural strength needed to withstand loads developed during braking.

In an effort to reduce cost, the binder in composition A was replaced with:

1. a resorcinol-phenol novolac resin which is cured by a reaction with para formaldehyde (para) at room temperature; and
2. liquid double salts of dibasic and monobasic phosphoric acid which is cured by the reaction with a catalytic oxide (magnesium oxide).

The friction modifiers (carbon and graphite) were reduced and the filler replaced by a liquid latex.

Since weight is considered a factor for an acceptable brake pad, the reinforcing fiber needed for strength was selected from a combination of about 60% steel fiber and 40% calcium- sodium metaphosphate fiber.

Figures 1, 2:
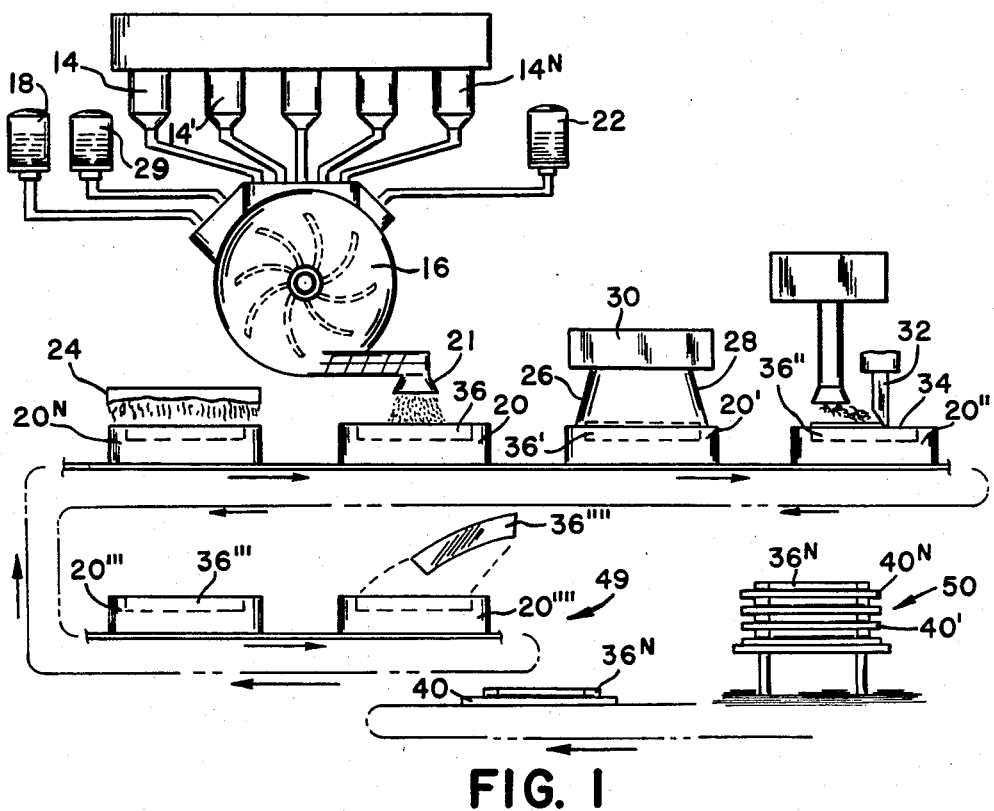
FIG. 1 is a schematic illustration of a manufacturing facility wherein a friction pad is made according to the principles of this invention.
FIG. 2 is a graph illustrating various combination of ingredients used in the manufacture of molded friction pads by the manufacturing facilities of FIG. 1.

When all the substitutions and modifications of composition A were completed, a new composition B having the approximate weight percentages shown in FIG. 2 was created.

The manufacture of a brake pad using composition B was as illustrated in FIG. 1. The dry ingredients; the reinforcing fiber (steel, although combinations of glass fiber calcium-sodium metaphosphate may also perform in a satisfactory manner, fillers (barytes, although combination of rubber scrap, whiting, mica, seacoal, wallestonite may also perform in a satisfactory manner) and friction modifiers (carbon and graphite, although combination of cashew nut powder, coke, iron powder, cryolite talc may also perform in a satisfactory manner) which were retained in hoppers 14, 14' . . . 14$^N$ were fed into mixer 16 in the weight percentages shown in FIG. 2. After the dry ingredients were mixed, liquid latex from tank 18, liquid plenolic resin from tank 29 and DSP from tank 22 were added to the mixer 16. When a uniform mix is achieved, metallic oxide (magnesium oxide) at about 8% by weight of the total mixture and at least 50% of which was very fine and classified as catalytic material, and a curing agent (para formaldehyde) were added to the mixer 16. The very fine magnesium oxide reacted with the DSP to create an exothermic reaction which can reach 65° C. within about 5 minutes. After the addition of the metallic oxide it is essential that the viscosity of the mix remain relatively high until such time as a quantity of material is deposited in molds 20, 20' . . . 20$^N$ as they pass the end of nozzle 21 since gelling occurs. One aid that also helps in the flow of the material into the molds 20, 20' . . . 20$^N$ is the heating of the molds 20, 20' . . . 20$^N$ by a radiant heater 24 just prior to reaching the nozzle 21.

After the molds 20, 20' . . . 20$^N$ are filled, they are grasped by fingers 26 and 28 of a vibrator 30 which gently shakes the molds 20, 20' . . . 20$^N$ without creating a separation of the ingredients to assure that the material conforms to the sides of the molds 20, 20' . . . 20$^N$. Thereafter, a scraper blade 32 levels the top surface 34 of the friction pad 36''. By this time, the exothermic reaction has built up in the internal temperature to about 65° C. and neutralization of the DSP changes the pH of the mixture from an acidic to basic by the metallic oxide reaction, the para cures the phenolic resin. The reaction of the metallic oxide with DSP and para with the phenolic resin forms an infusible matrix system for the resulting friction pad. When the molds 20, 20' . . . 20$^N$ reach a return station 49, molds 20, 20' . . . 20$^N$ turned over and the pads 36'''' placed on a second conveyor or tray 40 for transportation to a ventilated chamber 50.

The pads 36 would normally cure at room temperature (20° C.) in from 12 to 48 hours but the curing time can be reduced to about 2 hours by maintaining the temperature in the ventilated chamber at 200° C.

After the brake pads made from compostion B were cured, they were tested on the sample dynamometer using the same test performed on sample of composition A. The average coefficient of friction for composition B is illustrated by curve 106 in FIG. 4 and the wear rate by curve 108 in FIG. 5. As can be seen, the addition of the reinforcing fiber and the creation of the two binder matrix inprove both the coefficient of friction and wear over composition A. In addition the percentage of DSP in the total composition should act as a retardant against the generating of a fire from frictional engagement thereby making this type composition a safer material.

In order to compare composition B with a typical semi-metallic brake pad of the type disclosed in U.S. Pat. No. 3,835,118, composition C shown in FIG. 2 was placed in a mixer and uniformly mixed. In composition C the reinforcing fiber was steel fiber, the friction modifiers were sponge iron, iron powder and barytes, the filler was barytes and the binder was phenolic resin+a hexa curative. After the mixture was mixed, a predetermined amount of the composition was placed in a mold to form a briquette. The briquette was formed by applying a force of about 350 Kg/cm$^2$ on the composition while in the presence of a temperature of about 120° C. Thereafter, the briquette was further cured in a chamber having a temperature of about 160° C. A friction pad or sample made with composition C was removed and when tested on the sample dynamometer produced an average coefficient of friction illustrated by curve 110 in FIG. 4 and a wear rate illustrated by curve 112 in FIG. 5. As can be seen, the friction of composition B is acceptable as compared with the base line composition C, however the wear rate is relatively high and may not be acceptable when a duty cycle above 175° C. is expected for normal use.

In an effort to evaluate other reinforcing fibers, the steel and calcium-sodium metaphosphate fiber in composition B were replaced with fiber glass and the friction modifiers were replaced by a minimum quantity of organic friction dust and cashew nut powder while the fillers were replaced by a large quantity of barytes and liquid latex. The phenolic resin and DSP were added in substantially equal amounts. The metallic oxide (magnesium oxide) was also reduced to a minimum amount of fine material, based on the weight percentage needed to establish a desired exothermic reaction to produce composition D shown in FIG. 2. After composition D was mixed and distributed to molds 20, 20' ... 20$^N$ it was transported to ventilated chamber 50 where it was allowed to cure at ambient temperature (20° C.) for about 48 hours. Thereafter a brake pad or sample of composition D was tested on a sample dynamometer. The average coefficient of friction for the sample of composition D is illustrated by curve 114 in FIG. 4 and the wear by curve 116 in FIG. 5. As can be seen, there is both an increase in the coefficient of friction and a lower wear experienced at higher temperatures (250° C.+) as compared to the other compositions A, B and C.

In an effort to further compare a cast or molded friction pad with a conventional press cured friction pad made with composition C, a composition E whose weight percentage is shown in FIG. 2 was compounded. As in composition C, the reinforcing fiber in composition E is steel fiber, the friction modifier (carbon and graphite), the filler (barytes and rubber scrap), the binder phenolic resin and DSP. In order to decrease the reaction time required to create gelling to less than 5 minutes, the percentages of metallic oxide was increased to about the 20% by weight of the DSP, as a result the composition started to gel in about 2 minutes. It is our opinion that the metallic oxide (magnesium oxide) could be increased in composition E to about 15% by weight of the total composition. As a result once the reaction is completed, a portion of the metallic oxide (magnesium oxide) would remain in the free state and would act as a friction modifier.

Figure 3:
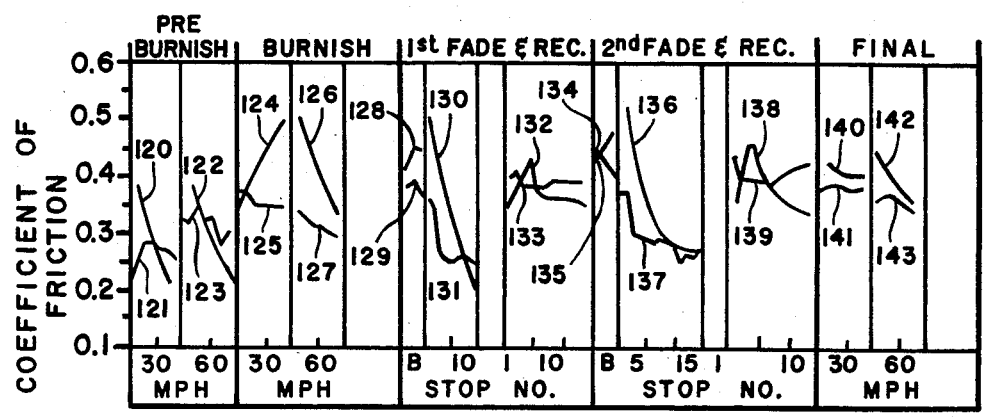
FIG. 3 is a graph which compares a coefficient of friction of a molded friction pad with a press cured friction pad.

Composition E was made into brake pads 36, 36' ... 36$^N$ in accordance with the method of manufacture for composition B. The brake pads 36, 36,' ... 36$^N$ were placed on a Ford Escort and compared with similar brake pads made with composition C. The test performed in FIG. 3 represents the coefficient of friction required to stop a vehicle at 30 to 60 mph and the change in friction experienced after a series of stops. Composition C or the base line is illustrated by curve 120, 122, 124, 126, 128, 130, 132, 134, 136, 138, 140 and 142 while composition E is illustrated by curves 121, 123, 125, 127, 129, 131, 133, 135, 137, 139, 141 and 143. As can be seen from FIG. 3, the coefficient of friction for the molded friction pad of composition E is more stable that a conventional base line press cured friction pad made of composition C. On examination of the rotor and the pads it was observed that the rotor wear for the composition E was higher than for composition C, however the pad wear was lower and the total overall wear was essentially the same for both compositions C and E.

Figure 6:
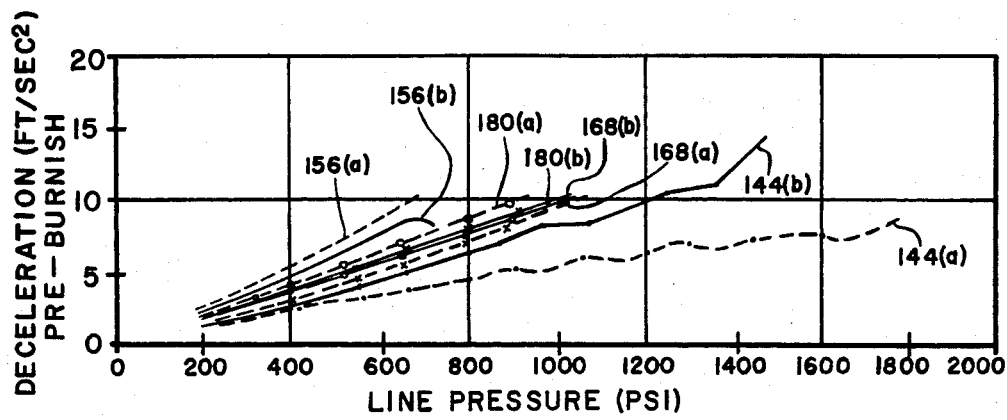
FIG. 6 is a graph comparing pre-burnish test results of molded friction pads with a press cured friction pad.
Figure 7:
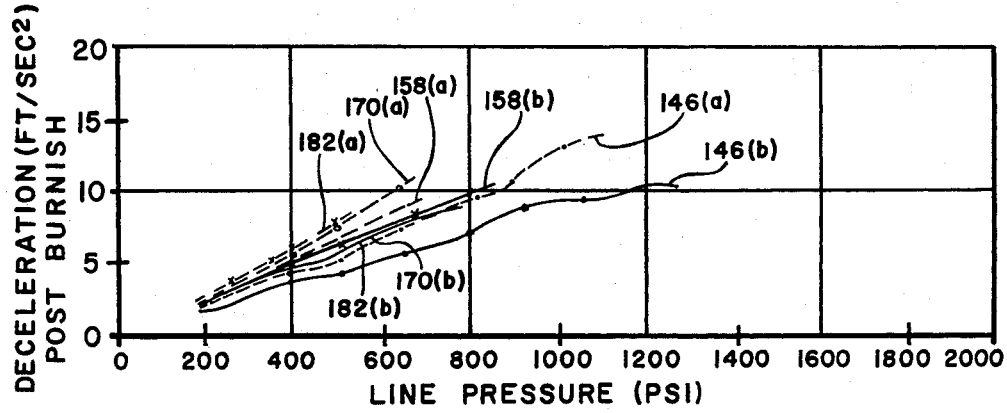
FIG. 7 is a graph comparing post-burnish test results of molded friction pads with a press cured friction pad.

In an effort to better understand the two binder matrix in a brake pad made from a composition of material without additional heat or pressure, the DSP in composition E was replaced with a substantially equal weight percent of phenolic resin to produce composition F shown in FIG. 2. In composition F the amount of liquid phenolic resin and liquid depolymerized rubber provided the carrier to establish the viscosity for creating a slurry sufficient to allow the mixture to flow into molds 20, 20' ... 20$^N$. The para and phenolic resin, while reacting at a slower rate, completely cured in about 48 hours. Thereafter, the Ford Escort S.A.E. Performance Test shown in FIG. 3 was run on the resulting brake pad made from composition F. The resulting curves 144 (a & b) in FIG. 6, 146 (a & b) in FIG. 7, 148 (a & b) in FIG. 8, 150 (a & b) and 152 (a & b) in FIG. 9, and 154 (a & b) and 156 (a & b) in FIG. 10 illustrate the effective coefficient of friction for composition F.

In order to evaluate composition F, a standard organic base friction material composition G shown in FIG. 2 was compounded. As shown in FIG. 2 for composition G the reinforcing fiber is asbestos, the friction modifier is cashew nut powder, the filler is rubber and barytes, and the binder is phenolic resin. Composition G was manufactured in a conventional manner wherein asbestos fiber, dry phenolic resin, equal parts of cashew nut powder and synthetic rubber scrap, and barytes were mixed together until a homogenous mixture was achieved. Thereafter, the mixture was placed in a mold and compacted into a briquette. The briquette was then transferred to a press and compressed by a force of about 350 Kg per cm$^2$ while the temperature of the briquette was raised to about 120° C. temperature. The 120° C. temperature causes the phenolic resin to flow throughout the mixture and establish a matrix for holding the other ingredients in a fixed position. The briquette was then transferred to a curing chamber having a temperature of about 260° C. to further set the resin. The briquette was then ground to a specific size corresponding to a brake pad. This brake pad was then subjected to a Ford Escort S.A.E. Performance test. The results of this test are illustrated by curves 156 (a & b) in FIG. 6, 158 (a & b) in FIG. 7, 160 (a & b), in FIG. 8, 162 (a & b) and 164 (a & b) in FIG. 9, and 166 (a & b) and 168 (a & b) in FIG. 10. From these tests it was concluded that the performance of composition F was substantially the equivalent of the organic base line composition G and could be substituted therefor in many applications where an organic friction brake pad is in use today.

To determine the feasibility of manufacturing a large quantity of the molded friction material, a first composition H shown in FIG. 2 was made in the laboratory. In composition H, the reinforcing fiber (steel), the friction modifiers (graphite and carbon), the filler (rubber and barytes), the binder (phenolic resin) and the primary slurry producing ingredient, DSP modified by metallic (magnesium) oxide were mixed together. The fine particles of metallic oxide in composition H were equal to about 20% by weight of the DSP. With this amount of metallic oxide it was calculated that there would be about five minutes before the exothermic temperature of the mixture would reach about 66° C. and an accelerated para and phenolic resin reaction begins. It should be noted that the mixture has an initial pH which is acidic but as the DSP reacts with the metallic oxide the mixture shifts to a basic pH. After the friction pads made with composition H were fully cured at ambient temperature 20° C. in about 24 hours they were subjected to a standard S.A.E. Performance test on a Ford Escort brake. The results of the various tests are illustrated by curves 169 (a & b) in FIG. 6, 170 (a & b) in FIG. 7, 172 (a & b) in FIG. 8, 173 (a & b) and 174 (a & b) in FIG. 9 and 175 (a & b) and 176 (a & b) in FIG. 10.

Figure 8:
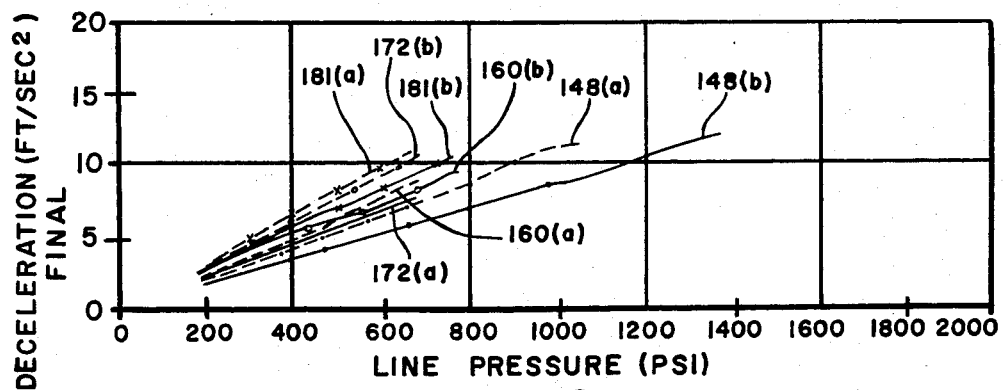
FIG. 8 is a graph comparing final test results of molded friction pads with a press cured friction pad.
Figure 9:
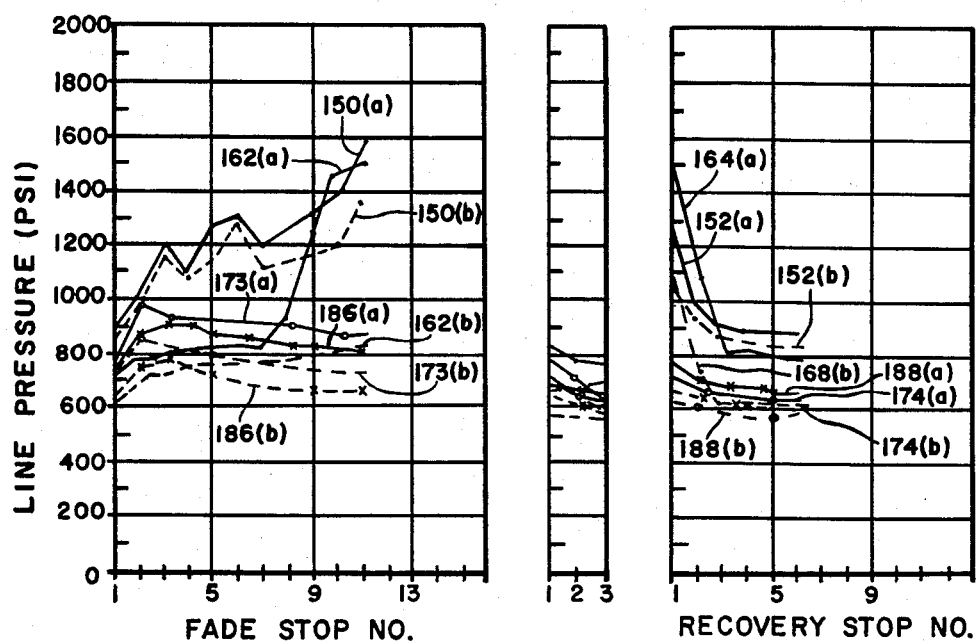
FIG. 9 is a graph comparing line pressure test results required to stop a vehicle using molded friction pads with a press cured friction pad.
Figure 10:
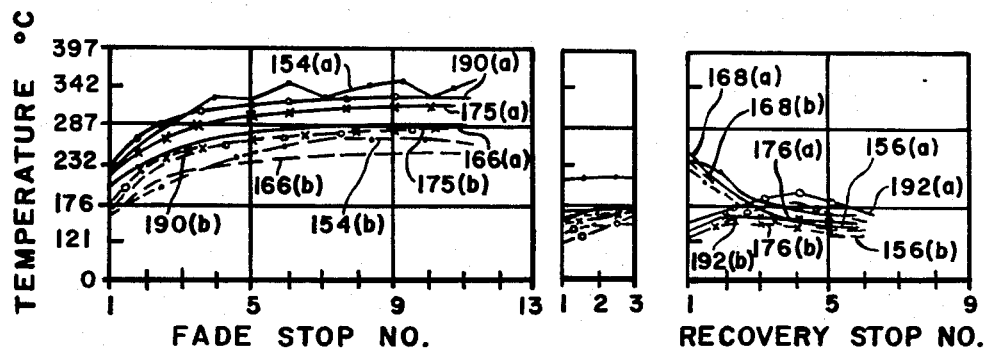
FIG. 10 is a graph comparing temperature test results of molded friction pads with a press cured friction pad.

Thereafter composition H was remixed and a small quantity, (2 drops) of a surfactant was added to improve binder particle bonding to produce composition I shown in FIG. 2. The method of manufacture of composition I was identical to composition H and after the ambient temperature cure, composition I was subjected to the same S.A.E. performance test for the Ford Escort. The results of these tests are illustrated by curves 180 (a & b) in FIG. 6, 182 (a & b) in FIG. 7, 184 (a & b)

in FIG. 8, 186 (*a* & *b*) and 188 (*a* & *b*) in FIG. 9 and 190 (*a* & *b*) and 192 (*a* & *b*) in FIG. 10.

From these tests, we concluded that production manufacturing was feasible and that a molded friction pad would perform in a manner acceptable to meet current S.A.E. Performance tests.

We claim:

1. A method of manufacturing a friction material for use in a brake comprising the steps of:
   combining reinforcing fiber, friction modifiers, fillers and phenolic resin in a container to produce a mixture of materials;
   adding liquid double salts of dibasic and monobasic phosphoric acid to said container to create a high viscosity in said mixture;
   simultaneously adding a metallic oxide and a curing agent to said mixture;
   filling molds with a fixed volume of said mixture, said mixture freely flowing into and completely filling said molds;
   transporting said molds to a ventilated chamber;
   maintaining said ventilated chamber at a temperature substantially equivalent to ambient temperature whereby said metallic oxide initially reacts with said liquid double salts of dibasic and monobasic phosphoric acid and to later allow said curing agent to react with and cure said phenolic resin, said reacted liquid double salts of dibasic and monobasic phosphoric acid and cured phenolic resin forming a two binder matrix which retains reinforcing fiber, friction modifiers, and fillers in a fixed position.

2. The method as recited in claim 1 wherein the step of adding the metallic oxide includes the step of:
   neutralizing the liquid double salts of dibasic and monobasic phosphoric acid to allow a basic reaction to occur between said curing agent and phenolic resin.

3. The method as recited in claim 1 further including the step of:
   removing any excess mixture from the molds after filling to essentially establish a final size for the resulting brake pad corresponding to the shape of each mold.

4. The method as recited in claim 3 further including the step of:
   transporting said excess mixture removed from said molds to a storage container.

5. The method as recited in claim 4 further including the step of:
   allowing said mixture to remain in said molds for a time period sufficient to develop green strength before transfer to said ventilating chamber to prevent the development of cracks therein.

6. The method as recited in claim 5 further including the step of:
   heating the molds prior to being filled with said mixture to aid in the curing of said phenolic resin.

7. The method as recited in claim 6 further including the step of:
   adding up to 50% additional metallic oxide to the mixture to decrease the reaction time required to complete the creation of said matrix.

8. A composition of material for use in a brake comprising a mixture of:
   reinforcing fiber;
   friction modifiers;
   fillers;
   phenolic resin;
   liquid double salts of dibasic and monobasic phosphoric acid;
   a curing agent; and
   metallic oxide; said metallic oxide reacting with said liquid double salts of dibasic and monobasic phosphoric acid to produce an exothermic temperature change within said mixture sufficient to accelerate a reaction between a curing agent and said phenolic resin, said reacted liquid double salts of dibasic and monobasic phosphoric acid and phenolic resin forming a binder which holds the remaining ingredients in a fixed matrix.

9. The composition of material as recited in claim 8 wherein said liquid double salts of dibasic and monobasic phosphoric acid consists of:
   from about 11–26% by weight of the total composition.

10. The composition of material as recited in claim 9 wherein said metallic oxide consists of:
    from about 3–12% by weight of the total composition.

11. The composition of material as recited in claim 9 wherein said metallic oxide is presented in an amount of 20% by weight of said liquid double salts of dibasic and monobasic phosphoric acid, said metallic oxide being sufficient to react with the liquid double salts of dibasic and monobasic phosphoric acid and change the pH of the mixture from an acid to a base to thereby permit said curing agent to thereafter react with said phenolic resin and develop said matrix.

12. The composition of material as recited in claim 8 wherein said mixture contains a sufficient amount of liquid double salts of dibasic and monobasic phosphoric acid to provide protection against the creation of a fire during a brake application.

13. The composition of material as recited in claim 12 wherein said mixture possesses sufficient viscosity to freely flow into a desired shaped mold prior to the creation of said fixed matrix.

14. The composition of material as recited in claim 10 wherein said metallic oxide is magnesium oxide.

15. The composition of material as recited in claim 14 further including:
    a surfactant to improve the internal bonding between the ingredients in the composition.

16. The composition of material as recited in claim 8 wherein said metallic oxide is present in an amount of from 5–15% by weight of the total composition, said metallic oxide being magnesium oxide and a portion of said magnesium oxide remains in the free state after the reaction to act as a friction modifier.

* * * * *